US007937593B2

(12) United States Patent
Chen et al.

(10) Patent No.: US 7,937,593 B2
(45) Date of Patent: May 3, 2011

(54) STORAGE DEVICE CONTENT AUTHENTICATION

(75) Inventors: Sherman (Xuemin) Chen, San Diego, CA (US); Steve W. Rodgers, San Diego, CA (US); Iue-Shuenn I. Chen, San Diego, CA (US); Francis Chi-Wai Cheung, Del Mar, CA (US)

(73) Assignee: Broadcom Corporation, Irvine, CA (US)

( * ) Notice: Subject to any disclaimer, the term of this patent is extended or adjusted under 35 U.S.C. 154(b) by 1643 days.

(21) Appl. No.: 10/913,197

(22) Filed: Aug. 6, 2004

(65) Prior Publication Data

US 2006/0036853 A1 Feb. 16, 2006

(51) Int. Cl.
 *G06F 12/14* (2006.01)
 *H04L 9/32* (2006.01)
(52) U.S. Cl. ......... 713/189; 713/161; 713/176; 705/67; 707/698
(58) Field of Classification Search ............... 713/161, 713/176; 380/232; 705/67; 707/9
See application file for complete search history.

(56) References Cited

U.S. PATENT DOCUMENTS

| | | | | |
|---|---|---|---|---|
| 6,390,373 B1 * | 5/2002 | Beyer et al. | ................... | 235/492 |
| 6,748,544 B1 * | 6/2004 | Challener et al. | ............... | 726/17 |
| 6,959,384 B1 * | 10/2005 | Serret-Avila | ................... | 713/176 |
| 7,224,688 B2 * | 5/2007 | Hirose | .......................... | 370/360 |
| 2003/0005301 A1 * | 1/2003 | Jutzi et al. | ..................... | 713/176 |
| 2003/0046238 A1 * | 3/2003 | Nonaka et al. | .................. | 705/51 |
| 2003/0079222 A1 * | 4/2003 | Boykin et al. | ................... | 725/31 |
| 2003/0084298 A1 * | 5/2003 | Messerges et al. | ........... | 713/176 |
| 2003/0196094 A1 * | 10/2003 | Hillis et al. | .................... | 713/179 |
| 2005/0120275 A1 * | 6/2005 | Fletcher et al. | ................ | 714/38 |
| 2005/0138270 A1 * | 6/2005 | Morais et al. | ................. | 711/102 |
| 2005/0169468 A1 * | 8/2005 | Fahrny et al. | ................. | 380/210 |
| 2006/0129848 A1 * | 6/2006 | Paksoy et al. | ................. | 713/193 |

OTHER PUBLICATIONS

FIPS PUB 180-1, "Secure Hash Standard", Federal Information Processing Standards Publication (Apr. 17, 1995).
FIPS PUB 197, "Advanced Encryption Standard (AES)" (Nov. 26, 2001).
FIPS PUB 46-3, "Data Encryption Standard (DES)", Federal Information Processing Standards Publication (Oct. 25, 1999).
FIPS PUB 186-1, "Data Signature Standard (DSS)", Federal Information Processing Standards Publication (Dec. 15, 1998).
FIPS PUB 186-2, "Data Signature Standard (DSS)", Federal Information Processing Standards Publication (Jan. 27, 2000).
"PKCS #1: RSA Encryption Standard", RSA Laboratories Technical Note, Version 1.5 (Nov. 1, 1993).
"PKCS #3: Diffie-Hellman Key-Agreement Standard", RSA Laboratories Technical Note, Version 1.4 (Nov. 1, 1993).

(Continued)

*Primary Examiner* — Minh Dieu Nguyen
(74) *Attorney, Agent, or Firm* — McAndrews, Held & Malloy, Ltd.

(57) ABSTRACT

Systems and methods that storage device content authentication are provided. A system that verfies storage device content received from a storage device may comprise, for exmple, a security processor coupled to the storage device. The security processor may be adapted to receive a partitioned storage device region from the storage device. The partitioned storage device region may comprise, for example, regional content and first hashed regional content. The security processor may generate, for example, second hashed regional content by performing a hashing function on the regional content received by the security processor. The security processor may compare, for example, the first hashed regional content to the second hashed regional content. The security processor may varify the regional content received by the security processor if the first hashed regional content is the same as the second hashed regional content.

35 Claims, 5 Drawing Sheets

OTHER PUBLICATIONS

H. Krawczyk et al., IETF RFC 2104, "HMAC : Keyed-Hashing for Message Authentication" (Feb. 1997).

PKCS #1 v2.1:RSA Encryption Standard, RSA Laboratories Technical Note, ver. 2.1 (Draft 2—Jan. 5, 2001).

* cited by examiner

US 7,937,593 B2

STORAGE DEVICE CONTENT AUTHENTICATION

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The security features of a set-top box (STB) system-on-a-chip (SoC), for example, may depend upon the security of the storage device used by the STB SoC. For example, the storage device may be an external flash memory, a synchronous dynamic random access memory (SDRAM) or another type of storage device. Storage device content, which is stored in the storage device, may include, for example, host processor instructions and/or data.

The security of the STB Soc may depend upon, for example, the security and reliability of the storage device content. For example, the storage device content may be altered or the storage device may be replaced with another storage device with altered content. If the storage device content is compromised, then the host processor may blindly execute the compromised content (e.g., host processor instructions). The host processor may never be aware of the compromised content and thus the security of the STB SoC may be successfully breached.

In addition, after the completion of the booting process or after the loading of the compromised content into the host processor, the host processor may be unable to verify its own code.

Further limitations and disadvantages of conventional and traditional approaches will become apparent to one of ordinary skill in the art through comparison of such systems with one or more aspects of the present invention as set forth in the remainder of the present application with reference to the drawings.

BRIEF SUMMARY OF THE INVENTION

Aspects of the present invention may be found in, for example, systems and methods that support storage content authentication.

In one embodiment according to certain aspects of the present invention, a method that verifies storage device content may include, for example, one or more of the following: partitioning the storage device content into a plurality of storage device regions, each storage device region comprising regional content and a first hashed regional content; receiving, by a secure processor, a particular storage device region; generating a second hashed regional content by performing a hashing function on the regional content of the particular storage device region received by the secure processor; comparing the first hashed regional content to the second hashed regional content; and accessing the regional content of the particular storage device region received by the secure processor if the first hashed regional content is the same as the second hashed regional content.

In another embodiment according to some aspects of the present invention, a system that verifies storage device content received from a storage device may comprise, for example, a security processor coupled to the storage device. The security processor may be adapted to receive a partitioned storage device region from the storage device. The partitioned storage device region may comprise, for example, regional content and first hashed regional content. The security processor may generate, for example, second hashed regional content by performing a hashing function on the regional content received by the security processor. The security processor may compare, for example, the first hashed regional content to the second hashed regional content. The security processor may verify the regional content received by the security processor if the first hashed regional content is the same as the second hashed regional content.

These and other features and advantages of the present invention may be appreciated from a review of the following detailed description of the present invention, along with the accompanying figures in which like reference numerals refer to like parts throughout.

DETAILED DESCRIPTION OF THE INVENTION

Some embodiments according to certain aspects of the present invention may relate to, for example, systems and methods that support storage device content authentication.

Figure 1:
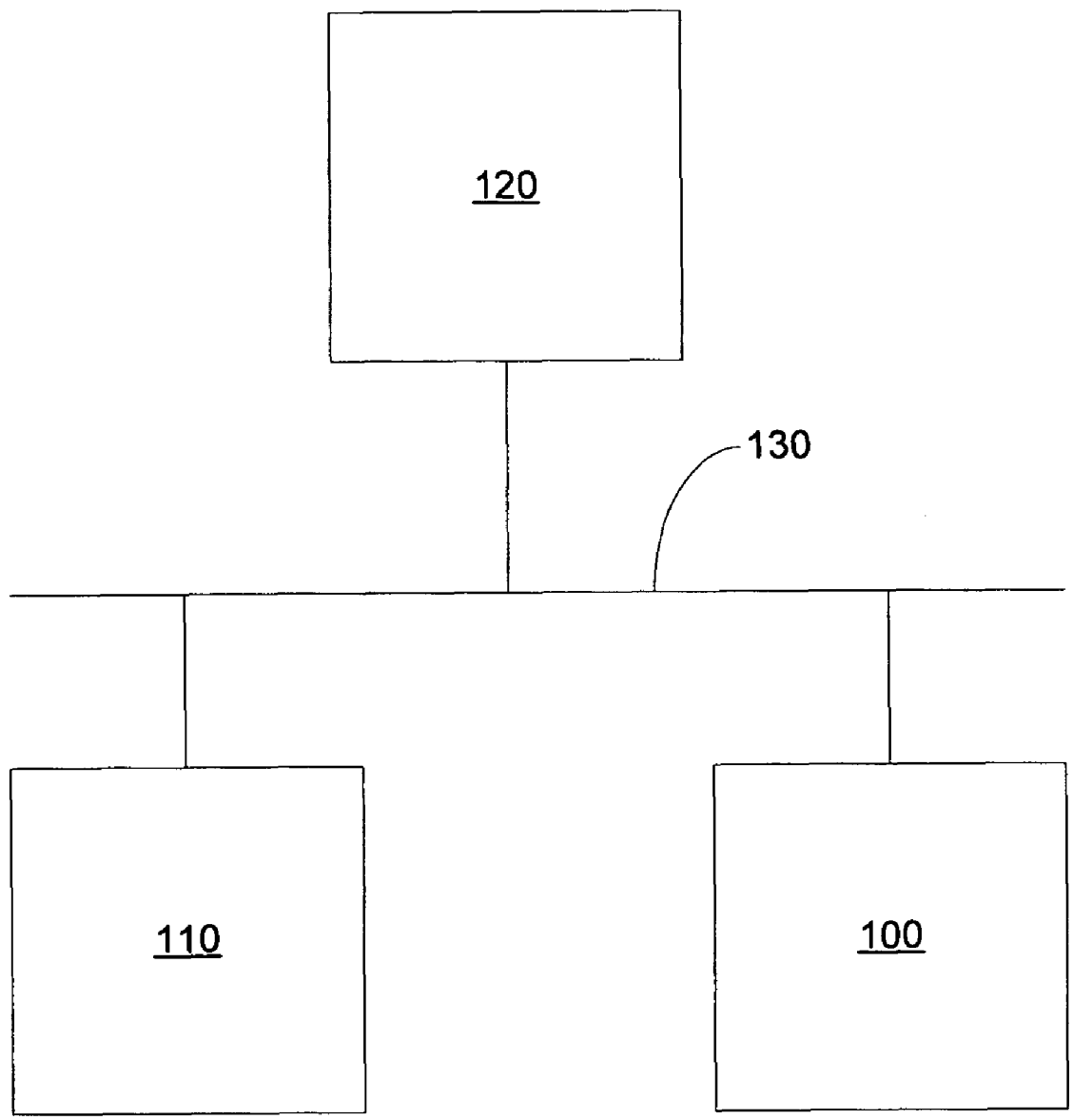
FIG. 1 shows a block diagram illustrating an embodiment of a system that authenticates storage device content according to some aspects of the present invention.

FIG. 1 shows a block diagram illustrating an embodiment of a system that authenticates storage device content according to some aspects of the present invention. The system may include, for example, a security processor 100, a host processor 110, a storage device 120 and a connection 130. The security processor 100, the host processor 110 and the storage device 120 may each be coupled to the connection 130. The storage device 120 may be, for example, a flash memory, an SDRAM or another type of storage device. The storage device 120 may be internal or external to an SoC (e.g., an STB SoC). The storage device 120 may be internal or external to an STB. The connection 130 may include, for example, one or more wired connections, buses, networks, wireless connections or combinations thereof. The connection 130 may provide, for example, a communications medium between at least two of the security processor 100, the host processor 110 and the storage device 120. For example, the host processor 110 and the security processor 100 may be connected via buses and may be part of the SoC. The storage device 120 may be connected to the host processor 110 and the security processor 100 via buses and may be external to the SoC. In another example, the storage device 120 may be external to the STB and may connected to the STB via one or more networks (e.g., a local area network (LAN), the Internet, etc.).

Figure 2:
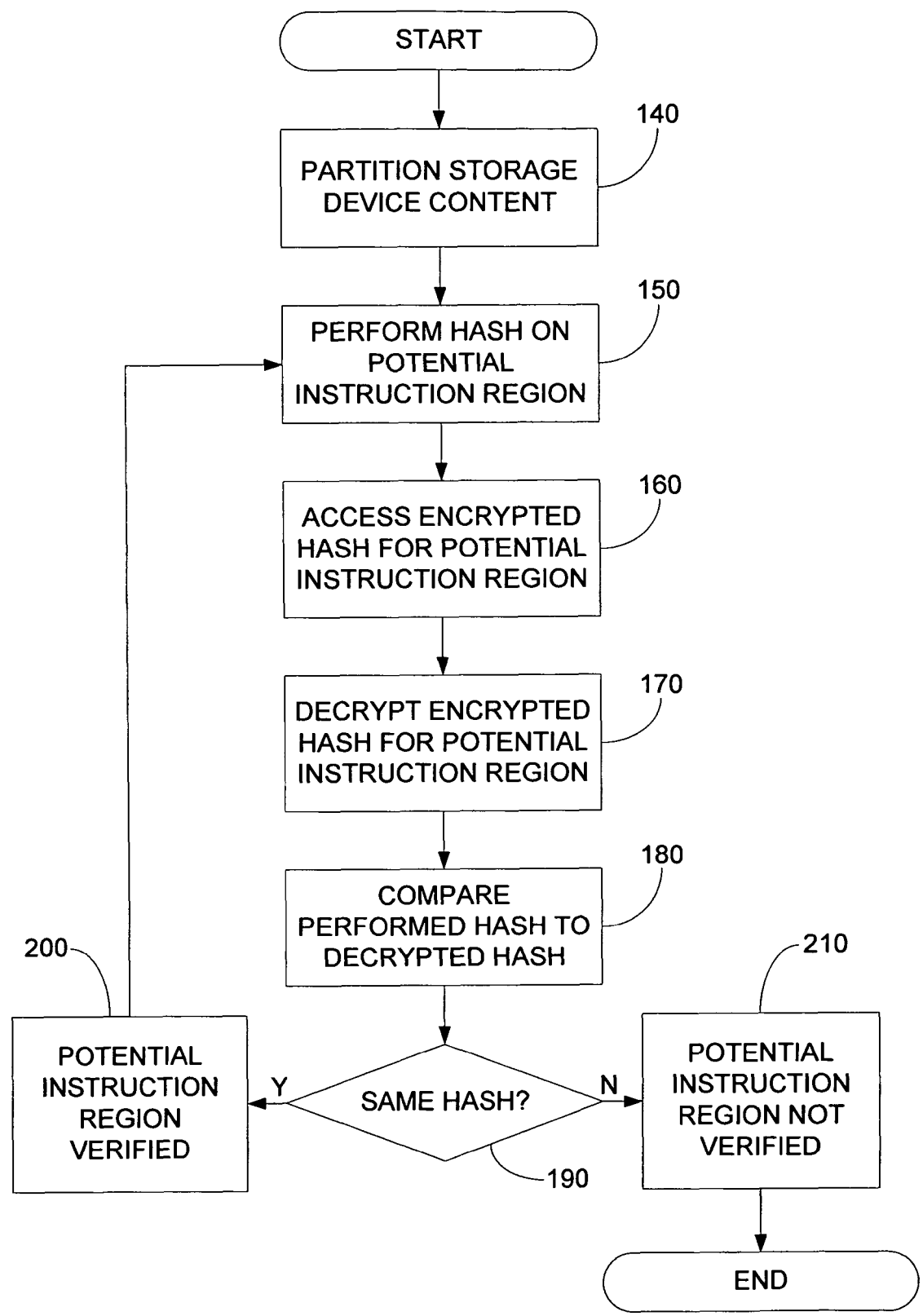
FIG. 2 shows a flow chart illustrating an embodiment of a method that authenticates storage device content according to the some aspects of the present invention.

FIG. 2 shows a flow chart illustrating an embodiment of a method that authenticates storage device content according to the some aspects of the present invention. In step 140, the contents (e.g., host processor instructions, data, etc.) of the storage device 120 may be partitioned into one or more regions (e.g., N regions where N is an integer). Each region may be, for example, separate from or overlap with other regions. Each region may include, for example, a potential instruction region (e.g., a region including potential instructions and/or potential data) and a hash of potential instruction region. The potential instruction region may be defined, for example, via programmable address registers or may be defined, for example, inside a boot read only memory (ROM). The hash may be located in a particular part of a corresponding region such as, for example, an end portion of the region. Each region may be signed by encrypting the hash with, for example, a private key. The private key may be, for example, part of a public key pair.

In step 150, the security processor 100 may perform a hash on a potential instruction region of a particular region of the storage device 120. The security processor 100 may perform concurrently, for example, a plurality of hashes on a plurality of potential instruction regions of a plurality of regions of the storage device 120. In one example, a plurality of processes may continually read instruction data and may calculate running hashes for each new instruction read from the storage device 120. In step 160, the security processor 100 may access and/or store the encrypted hash of the particular region of the storage device 120. In step 170, the security processor 100 may decrypt the encrypted hash of the particular region of the storage device 120. The security processor 100 may use, for example, a public key corresponding to the private key in decrypting the encrypted hash. In step 180, the security processor 100 may then compare the hash performed by the security processor 100 with the decrypted hash.

In query 190, if the hash performed by the security processor 100 is the same as the decrypted hash, then, in step 200, the potential instruction region of the particular region of the storage device 120 has been verified (e.g., authenticated) and the operation of the SoC may continue. For example, once the potential instructions of the potential instruction region has been deemed trustworthy by the verification process, the host processor 110 may then fetch and/or execute the potential instructions from the trusted region of the storage device 120. The process may then jump back to step 150 if the process is continual, periodic or triggered. If the hash performed by the security processor 100 is not the same as the decrypted hash, then, in step 210, the potential instruction region of the particular region of the storage device 120 is not verified and the security processor 100 may take action to secure the SoC. For example, the security processor 100 may force an exception to the host processor 110. In one example, the security processor 100 may set a bit in a register, which may cause an exception to the host processor 110. The verification steps taken by the security processor 100 may be performed continually or periodically or may be triggered.

Figure 3:
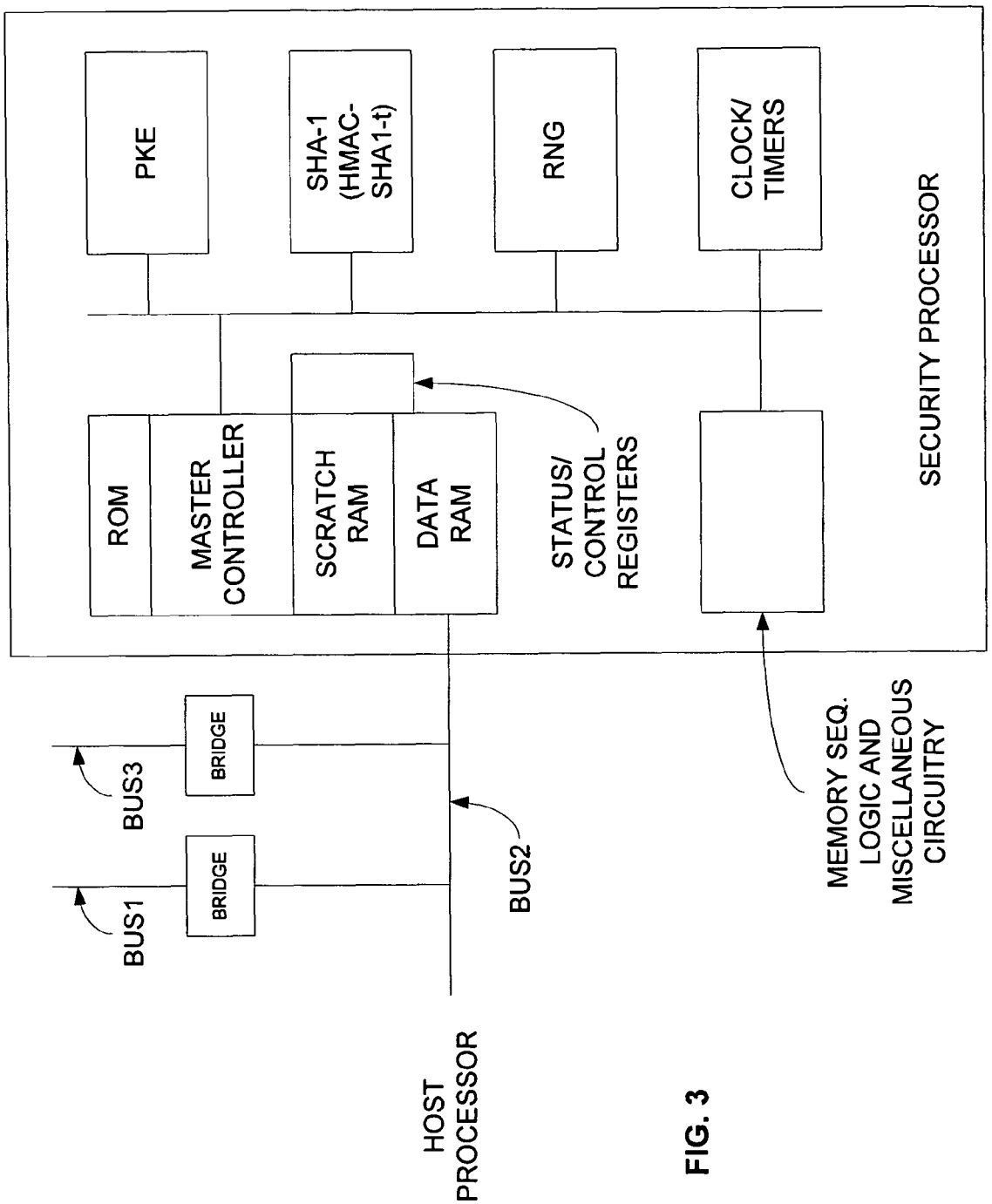
FIG. 3 shows a block diagram illustrating an embodiment of a system that authenticates storage device content according to some aspects of the present invention.

FIG. 3 shows a block diagram illustrating an embodiment of a system that authenticates storage device content according to some aspects of the present invention. Although other types of storage devices are also contemplated by other embodiments of the present invention, the following illustrative examples may refer to a flash memory or a flash verification. It is understood that the following discussion may be applied to other types of storage devices and other types of storage device verifications as well.

The security processor may include one or more of the following: a master controller, a ROM, a data/scratch RAM, a random number generator (RNG), clock/timers, a public key engine (PKE), a secure hash algorithm (SHA) and a hash message authentication code (HMAC).

The master controller may include, for example, a processor (e.g., a reduced-instruction-set-computer (RISC) processor) with ROM code, data RAM and scratch RAM to execute the various commands and program global and internal registers. The master controller may also include, for example, an address decoder for each slave block coupled to an internal bus.

The ROM may store, for example, security processing code. The ROM may also provide one or more of the following functions: self-test; secure code loader; hardware access crypto primitives such as, for example, DES, 3DES, SHA-1, HMAC-SHA-1-t, RSA, DH and DSA; stored public keys; and flash memory content authentication routines.

The internal data RAM may be used, for example, for data space or program scratch space. The security processor may provide a hardware protection mechanism that may ensure a separation between execution space and data space in the RAM. The data RAM may be split internally into, for example, three sections enforced by the security processor: an input/output; a scratch (e.g., a scratch for the master controller); and a long term (e.g., a long term maintained between commands).

The random number generator may be, for example, a "true" random source. It may use free running oscillators to capture thermal noise as the source of randomness and may be post processed using the SHA-1 block by the master controller.

The security processor may provide a clock time tick that can be used, for example, for time stamping purposes. The time stamp may be used, for example, to drive the flash memory authentication process.

The PKE may implement a public key encryption/decryption algorithm. See, for example, "PKCS #1: RSA Encryption Standard", Version 1.5, RSA Laboratories (November 1993); "PKCS #2 v2.0: RSA Encryption Standard", Version 2.0, RSA Laboratories (Oct. 1, 1999); and "PKCS #3: Diffie-Hellman Key-Agreement Standard", Version 1.4 (Nov. 1, 1993); all of which are incorporated herein by reference in their entirety.

As an example, an RSA public key algorithm may be used for digital signature authentication. RSA is a two-key system. A first key, the public key, may be used to encrypt a value so that only the holder of the second key, a private key, may decrypt it. The public key may also be used to decrypt a value that only the holder of the private key may have encrypted.

In an RSA scheme, an entity may create an RSA public key and a corresponding private key as follows: generating two large random (and distinct) prime numbers p and q, each roughly the same size; calculating n=pq (called the modulus) where n is made public and p and q are kept hidden (e.g., secret); computing Euler's function $\phi(n)=(p-1)(q-1)$; selecting a random integer e (called the encryption exponent), $1<e<\phi(n)$ such that $\gcd(e,\phi(n))=1$ where gcd means greatest common divisor, e being relatively prime to $\phi(n)$; and computing integer d (called the decryption exponent) such that $1<d<\phi(n)$ and $ed\equiv 1 \pmod{\phi(n)}$, d being a straight forward computation knowing p and q, otherwise being difficult. The entity's public key is (n, e) and the entity's private key is d. Messages m and ciphertext c may be represented as integers in the range (0, n−1). The encryption of a message m and the decryption of a ciphertext c may be defined as follows:

Encryption: $c = E_e(m) = (m)^e$ (mod n)

Decryption: $m = D_d(c) = (c)^d$ (mod n).

The secure hash algorithm SHA-1 may be used to hash messages for authentication. A message m may be 1 bits in length where $0 \leq 1 \leq 2^{64}$, for example. The SHA-1 algorithm may use a message schedule of eighty 32-bit words; five working variables of 32 bits each; and a hash value of five 32-bit words. As a result of SHA-1, a 160-bit message digest may be produced. A detailed description of the SHA-1 algorithm is given in FIPS-PUB 180-1, "Secure Hash Standard", Federal Information Processing Standards Publication (FIPS PUB) (Jan. 27, 2000), which is incorporated herein by reference in its entirety.

HMAC is a keyed-hashing algorithm for message authentication. See, for example, IETF RFC 2104, "HMAC: Keyed-Hashing for Message Authentication", Krawczyk, Bellare and Cannetti (March 1996), which is incorporated herein by reference in its entirety. HMAC may check the integrity of a message transmitted over or stored in an unreliable medium. A mechanism that provides such an integrity check based on a secret key may be called a message authentication code (MAC). In some embodiments, a MAC may be based on the cryptographic SHA-1 hash function and may be used between a server and an STB that share a secret OTP key to validate messages transmitted therebetween.

In some examples, B=64, which is an input block length in bytes of SHA-1, and L=20, which is an output block length of SHA-1. An authentication key K may be of any length up to B. Two fixed and different strings, ipad and opad, may be defined as ipad equaling the byte 0×36 repeated B times and opad equaling the byte 0×5C repeated B times. To compute HMAC-SHA-1 over the message, the following steps may be performed: (1) appending zeros to the end of K to create a B byte string (e.g., if K is of length 8 bytes and B=64, then K may be appended with 56 zero bytes 0×00); (2) performing XOR (e.g., bitwise exclusive OR) between the B byte string created in step (1) and ipad; (3) appending the stream of the message to the B byte string resulting from step (2); (4) applying SHA-1 to the stream generated in step (3) and saving the output result; (5) performing XOR (e.g., bitwise exclusive OR) between the B byte string created in step (1) and opad; (6) appending the SHA-1 result from step (4) to the B byte string resulting from step (5); (7) applying SHA-1 to the stream generated in step (6) and outputting the HMAC result; and (8) truncating the output of HMAC by outputting the t leftmost bits of the HMAC computation to generate HMAC-SHA-1-t output.

After host processor booting, a security processor may perform the function of flash verification by executing a verification code with hardware assistance. In some embodiments, the flash verification ROM code may use particular parameters (e.g., hardware parameters, software parameters, firmware parameters, etc.) being stored in memory (e.g., non-volatile memory).

In some embodiments according to certain aspects of the present invention, upon security processor reset, timers may be set to periodically trigger the verification process. The start address and length for a particular flash memory region to be verified may be, for example, predetermined and stored in the flash memory or loaded by command from the host processor. When a timer indicates that the verification process should be performed, the security processor may apply SHA-1 to compute a digest A over the portion of flash memory (e.g., external flash memory) specified by the application. The STB manufacturer, for example, may store a private-key-encrypted signature (e.g., a Rivest-Shamir-Adleman (RSA) encrypted signature) of the SHA-1 digest in the flash memory. The flash verification code may call a public key engine (PKE) to perform decryption (e.g., RSA decryption) of the SHA-1 signature that resides in the flash memory to obtain the manufacturer computed digest B. The decryption may employ, for example, a public key provided by the PKE. The computed SHA-1 digest A may then be compared to the decrypted (e.g., RSA decrypted), encrypted digest B that was stored in the flash memory. If A equals B, then the SHA-1 digest may be validated and the operations of the SoC may continue. If A does not equal B, then the SHA-1 digest cannot be validated and the host processor, for example, may be forced, for example, by the security processor to jump back to a reset vector.

For public key decryption (e.g., RSA decryption), the PKE may use either an internally stored public key or an externally stored public key. The number of internally stored keys may depend on any optimizations or any changes that may be set forth by the verification process code. The externally stored public keys may be loaded, for example, through a secure interface (SI). Input data to the SI may be stored, for example, in the flash memory. This configuration may provide additional flexibility to the system.

Figure 4:
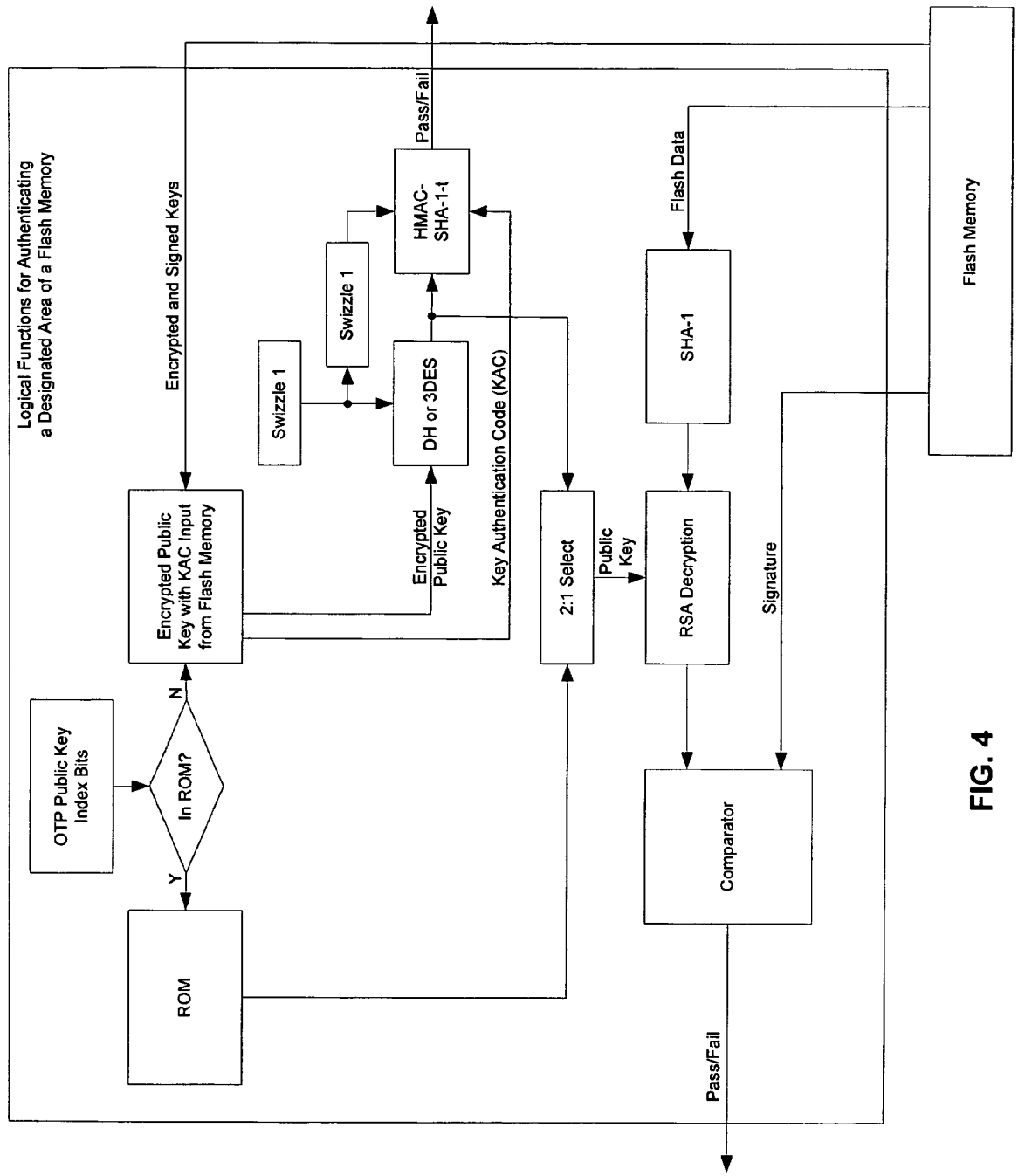
FIG. 4 shows a flow diagram of a method and a system that support a flash verification process according to an embodiment of the present invention.

FIG. 4 shows a flow diagram of a method and a system that support a flash verification process according to an embodiment of the present invention. One-time-programmable (OTP) public key index bits may indicate, for example, which public key may be used for decryption (e.g., RSA decryption) or encryption (e.g., RSA encryption). If the particular public key resides in the ROM, then ROM may send the public key to the RSA decryptor via a 2:1 selector. Flash data from the flash memory may be hashed by the SHA-1 block before being decrypted by the RSA decryptor using the public key that resided in the ROM. A comparator compares the decrypted, hashed flash data with the signature in determining whether the flash verification has passed or failed. The signature may be decrypted before being compared. In another example, the public key may be used to encrypt the hashed flash data and then the comparator may compare the encrypted, hashed flash data with the signature residing in the flash memory.

If the particular public key does not reside in the ROM, then the particular public key may be loaded through an SI with input data of the SI stored, for example, in the flash memory. The flash memory may then send encrypted and signed keys to the security processor. The flash memory may send, for example, an encrypted public key to a decryption engine that may employ, for example, a Diffie-Hellman (DH) algorithm or triple data encryption standard (3DES). The flash memory may also send, for example, a key authentication code (KAC) to the HMAC-SHA-1-t block. The decryption engine may be used with the hardware acceleration for the HMAC-SHA-1-t block to decrypt and to authenticate the encrypted and signed external keys.

For a scrambler that uses the encryption (or decryption) engine, the protection of the key may be a substantial security task. For many applications, the key for the scrambler may be generated and manipulated by using a customer key, a customer key selection and a key variation. The customer key may be assigned, for example, to a particular vendor of the STB. The customer key selection may be assigned, for example, for different operating modes such as, for example, a live decoding mode, a playback mode, etc. A key variation may be used to distinguish between different STBs. Such key generation and the manipulation may be provided by swizzle logic. Swizzle logic Swizzle 1 and Swizzle 2 are two swizzle logic blocks that may provide a key via key, generation and manipulation, to the encryption (or decryption) engine and the HMAC-SHA-1-t block.

Figure 5:
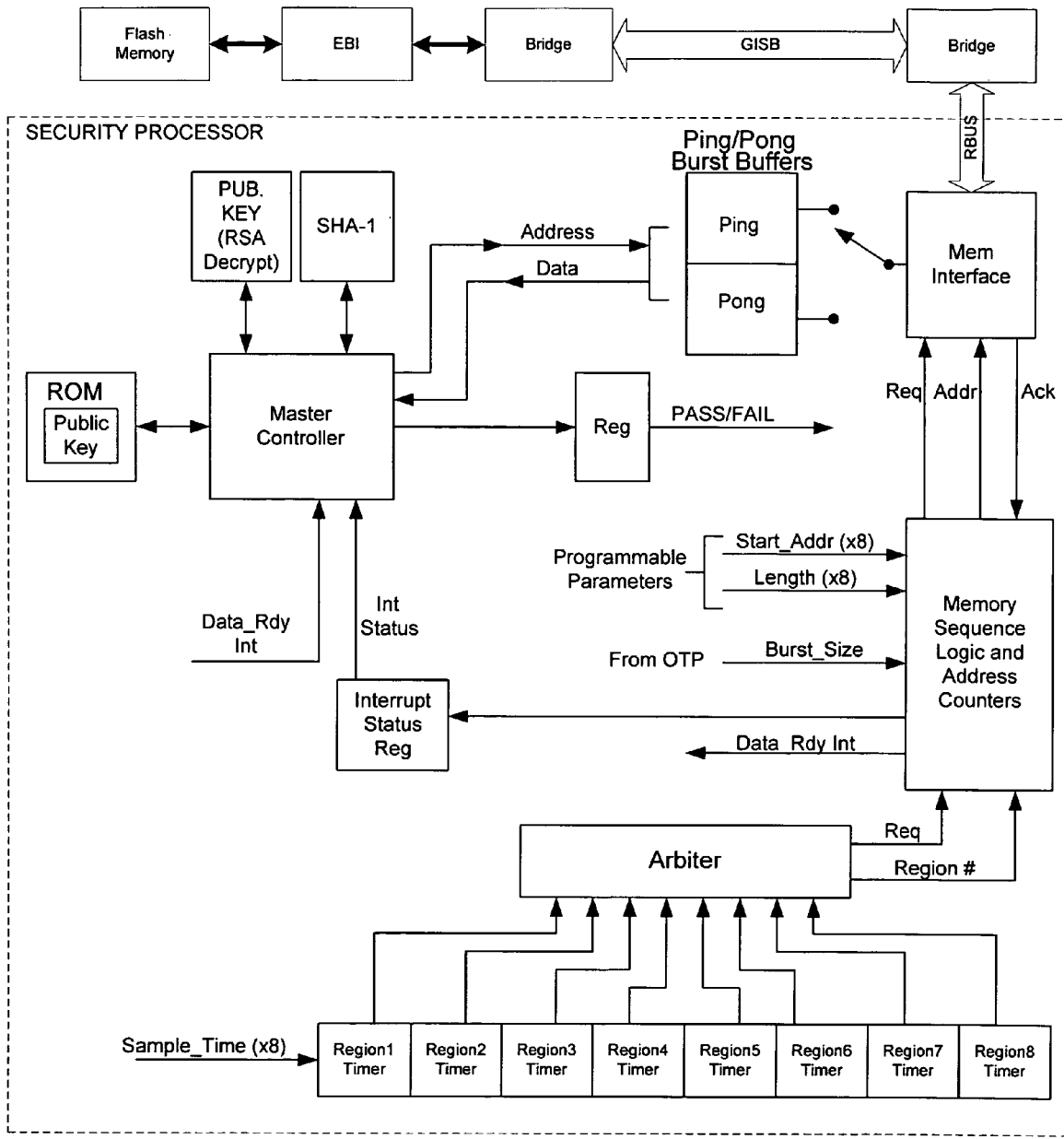
FIG. 5 shows a block diagram illustrating an embodiment of a system that authenticates storage device content according to some aspects of the present invention.

FIG. 5 shows a block diagram illustrating an embodiment of a system that authenticates storage device content according to some aspects of the present invention. The master controller may directly read the data burst buffers and an interrupt status register (e.g., without a message from the host being loaded via a message interface). The system may receive, for example, a read command message from a hardware message generator, which may reside between the burst buffers and the master controller.

One or more of the following operations may be performed in implementing a flash verification process according to some embodiments of the present invention.

After reset, a single memory region may be defined (e.g., from the host boot ROM). The start address and length for the first region of the flash memory may be fed into a memory sequencer. The verification process for the first region may be the same, for example, as the current security boot ROM. After the first region is verified, the host process may commence execution from that region and then configure up to N−1 more regions.

When the individual region timers indicate that new data is requested, the region timers may send a request to the memory sequencer via an arbiter. The memory sequencer may commence reading data from the specified start address for a particular region using the specified burst size. The sample time may be an average time. The timers may actually request data reads at pseudo-random intervals, for example.

When a burst of data, which may be data to be verified or signatures, has been loaded into the burst buffers from flash memory or SDRAM, the sequencer logic may load the interrupt status register with a value that may indicate one or more of the following: location and start address of just received data (ping buffer, pong buffer or ring buffer); size of the burst; data region (e.g., data regions I to N) from which the current burst is from; data type (e.g., signature or data); and information about the end of a data region or a signature.

The sequence logic may then interrupt the master controller.

The master controller may read the interrupt status register and then, based on the interrupt status, may begin reading data out of the (ping, pong or ring) burst buffer.

Each M bytes of data read from the burst buffer may be hashed using an SHA-1 accelerator. The intermediary hash value may be stored in the data buffer at an offset related to the data region. For example, up to N intermediary hash values may be stored simultaneously. M and N may be integers. For example, M may be equal to 512 or a multiple of 512.

At a subsequent interrupt, the security processor may start from the previous hashed value of that region and may generate the next hashed value by reading in the latest data from the flash memory. The process may continue for each new interrupt. Due to differences in sampling times, successive interrupts may be from the same region or may be from different regions. The interrupt status register may indicate, for example, which address region the current data is from so that the security processor need not track such information.

When an interrupt occurs and the status register indicates that the signature value resides in the data, the security processor may complete the data hash up to the last data before the signature and then may write the hash value to the data buffer. RSA may be used to decrypt a signature using, for example, a stored public key. The public key may be programmed, for example, into the ROM and the decryption need not require a key-exchange mechanism.

The security processor may compare the decrypted signature to the last stored hash value for that region. If the two match, then the security processor might not take further action. If the two do not match, then the security processor may write to a register to a "fail" bit. External hardware may use the set fail bit to generate a host processor exception.

In some embodiments according to the present invention, handshaking is not performed between the master controller and the memory sequencer so that no new data may be read until the master controller is able to handle the new data. Such an implementation may be used in a "fast as possible" mode in which the sampling time may be set equal to the maximum rate which can be processed.

Other aspects of the flash verification process such as, for example, pseudo-random timing between code accesses and exception generation, if the host processor attempts to access an unverified region, for example, may be implemented in hardware.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for verifying storage device content, comprising:
    (a) partitioning the storage device content into a plurality of separate storage device regions, each storage device region comprising a potential instruction region including executable instructions and data and a first region that includes a single first hash of the potential instruction region, the first region being located in an end portion of the storage device region, the potential instruction region being defined in a boot read only memory;
    (b) receiving, by a secure processor, a particular storage device region, the security processor comprising a random access memory;
    (c) ensuring, by the secure processor, a separation between an execution space and a data space in the random access memory;
    (d) providing, by the secure processor, a hardware protector that splits the random access memory into sections;
    (e) generating a second hashed regional content by performing a single hashing function on the potential instruction region that includes the executable instructions of the particular storage device region received by the secure processor;
    (f) comparing the single first hash of the potential instruction region of the particular storage device region to the second hashed regional content;
    (g) accessing and executing, by a host processor that is separate from the secure processor and is part of a system on a chip (SoC) of a set top box, the executable instructions of the potential instruction region of the particular storage device region if the single first hash of the potential instruction region of the particular storage device region is the same as the second hashed regional content; and
    (h) preventing access, by the host processor, to the potential instruction region of the particular storage device region received by the secure processor if the single first hash of the potential instruction region of the particular storage device region is not the same as the second hashed regional content.

2. The method according to claim 1,
wherein the single first hash of the potential instruction region of the particular storage device region comprises a first hash value,
wherein the second hashed regional content comprises a second hash value, and
wherein the first hash value is compared to the second hash value.

3. The method according to claim 1, wherein the host processor, the secure processor and a memory that stores the storage device content are connected via one or more buses in a single device.

4. The method according to claim 1, wherein the storage device content comprises at least one of flash memory content and SDRAM content.

5. The method according to claim 1, further comprising:
cryptographically signing the particular storage device region before (b).

6. The method according to claim 5, wherein cryptographically signing comprises applying at least one of a private key and a public key over the particular storage device region.

7. The method according to claim 5, further comprising:
decrypting the cryptographically signed storage device region.

8. The method according to claim 7, wherein decrypting comprises applying at least one of a private key and a public key over the cryptographically signed storage device region.

9. The method according to claim 1, wherein (e) comprises generating a second hashed regional content by performing a one-way hashing function on the potential instruction region of the particular storage device region received by the secure processor.

10. The method according to claim 1, wherein (e) comprises generating a second hashed regional content by performing a secure hash algorithm.

11. The method according to claim 1, further comprising:
causing an exception to the host processor if single first hash of the potential instruction region of the particular storage device region is not the same as the second hashed regional content.

12. The method according to claim 1, further comprising:
setting a fail bit in a register if single first hash of the potential instruction region of the particular storage device region is not the same as the second hashed regional content.

13. The method according to claim 1, further comprising: repeating (b), (e), (f), (g) and (h).

14. The method according to claim 1, further comprising: performing (b), (e), (f), (g) and (h) concurrently for at least two storage device regions.

15. The method according to claim 14, further comprising: repeatedly performing (b), (e), (f), (g) and (h) concurrently for at least two storage device regions.

16. The method according to claim 1, further comprising: periodically (b), (e), (f), and (g) and (h) for respective storage device regions.

17. The method according to claim 1, further comprising: periodically repeating (b), (e), (f), (g) and (h).

18. A system for verifying storage device content received from a storage device, comprising:
a security processor coupled to the storage device that is external to the security processor, the security processor adapted to receive a partitioned storage device region from the storage device, the partitioned storage device region comprising a potential instruction region including executable instructions and a first region that includes a single first hash of the potential instruction region, the potential instruction region is defined inside a boot read only memory, the first region being located in an end portion of the storage device region; and
a host processor that is separate from the security processor, the host processor being connected with the security processor and the storage device via one or more buses, the host processor being part of a system on a chip (SoC) of a set top box,
wherein the security processor generates second hashed regional content by performing a single hashing function on the potential instruction region that includes the executable instructions received by the security processor,
wherein the security processor compares the single first hash of the potential instruction region of a particular partitioned storage device region to the second hashed regional content,
wherein the security processor verifies the regional content received by the security processor if the single first hash of the potential instruction region of the particular partitioned storage device region is the same as the second hashed regional content;
wherein the host processor accesses and executes the executable instructions of the potential instruction region of the particular partitioned storage device region if the particular partitioned storage device region is verified by the security processor; and
wherein the security processor prevents the host processor from executing the executable instructions of the potential instruction region if the single first hash of the potential instruction region of the particular partitioned storage device region is not the same as the second hashed regional content.

19. The system according to claim 18, wherein the security processor sets one or more bits in a register that causes an exception to the host processor if the single hash of the potential instruction region of the particular partitioned storage device region is not the same as the second hashed regional content.

20. The system according to claim 18, wherein the security processor causes the host processor to jump back to a reset vector if the single first hash of the potential instruction region of the particular storage device region is not the same as the second hashed regional content.

21. The system according to claim 18, wherein the potential instruction region is defined via programmable address registers.

22. The system according to claim 18,
wherein the host processor, the security processor and the storage device are wirelessly connected with each other.

23. The system according to claim 18, wherein the received partitioned storage device region is encrypted using an encryption key.

24. The system according to claim 23, wherein the encryption key is a private key in a two-key encryption system.

25. The system according to claim 24, wherein the security processor decrypts the encrypted storage device region using a public key in the two-key encryption system.

26. The system according to claim 25, wherein the security processor comprises a public key engine.

27. The system according to claim 25, wherein the security processor enforces at least three sections of the random access memory of the security processor.

28. The system according to claim 27, wherein a read only memory stores an authentication routine executed by the security processor.

29. The system according to claim 27, wherein the security processor comprises a one-way hasher.

30. The system according to claim 18, wherein the security processor comprises a plurality of regional timers, each regional timer indicating to the security processor when to periodically authenticate respective regional content of a particular partitioned storage device region of the storage device.

31. The system according to claim 18, wherein the security processor is adapted to authenticate concurrently at least two potential instruction regions of particular partitioned storage device regions of the storage device.

32. The system according to claim 18, wherein the security processor periodically authenticates potential instruction region of a particular partitioned storage device region of the storage device.

33. The system according to claim 18, wherein the security processor comprises memory sequence logic.

34. The system according to claim 18, wherein the security processor comprises a random number generator.

35. The system according to claim 18, wherein the storage device comprises flash memory.

\* \* \* \* \*